US007036049B2

(12) United States Patent
Ali et al.

(10) Patent No.: US 7,036,049 B2
(45) Date of Patent: Apr. 25, 2006

(54) SYSTEM AND METHOD FOR COLLECTING STATISTICS FOR A COMMUNICATION NETWORK

(75) Inventors: Rehan M. Ali, Nepean (CA); Jeffrey Furry, Kanata (CA); Denise Ching Yee Chang, Gloucester (CA)

(73) Assignee: Alcatel Canada Inc., Kanata (CA)

( * ) Notice: Subject to any disclaimer, the term of this patent is extended or adjusted under 35 U.S.C. 154(b) by 600 days.

(21) Appl. No.: 10/195,491

(22) Filed: Jul. 16, 2002

(65) Prior Publication Data

US 2003/0115508 A1 Jun. 19, 2003

(30) Foreign Application Priority Data

Dec. 19, 2001 (CA) ................................. 2365430

(51) Int. Cl.
G06F 11/00 (2006.01)
(52) U.S. Cl. ..................................................... 714/47
(58) Field of Classification Search ................... 714/47
See application file for complete search history.

(56) References Cited

U.S. PATENT DOCUMENTS

| 5,367,670 | A | * | 11/1994 | Ward et al. .................... 714/47 |
| 5,506,955 | A | * | 4/1996 | Chen et al. .................... 714/26 |
| 5,680,409 | A | * | 10/1997 | Qin et al. .................... 714/799 |
| 5,748,098 | A | | 5/1998 | Grace et al. |
| 5,819,028 | A | * | 10/1998 | Manghirmalani et al. ..... 714/57 |
| 5,913,036 | A | * | 6/1999 | Brownmiller et al. ...... 709/224 |
| 6,021,117 | A | | 2/2000 | Juniper et al. |
| 6,108,800 | A | * | 8/2000 | Asawa .......................... 714/47 |
| 6,321,338 | B1 | | 11/2001 | Porras et al. |
| 6,327,677 | B1 | * | 12/2001 | Garg et al. .................... 714/37 |
| 6,598,195 | B1 | * | 7/2003 | Adibhatla et al. .......... 714/745 |
| 6,738,933 | B1 | * | 5/2004 | Fraenkel et al. .............. 714/47 |

FOREIGN PATENT DOCUMENTS

WO WO 9920034 4/1999

OTHER PUBLICATIONS

Amer P D et al "management of Smapled Real-Time Network Measurements" Proceedings of the conference on Local Proceedings of the Conference on Local Computer Networks Jan. 1989 pp. 62 to 68.
Anonymous "hp dynamic Netvalue analyzer 1.0 an hp netaction product". Hewlett Packard—HP, May 2001 XP002219757 Whole Document.

* cited by examiner

*Primary Examiner*—Robert Beausoliel
*Assistant Examiner*—Michael Maskulinski
(74) *Attorney, Agent, or Firm*—Marks & Clerk; Richard J. Mitchell

(57) ABSTRACT

A system and method of tracking an error condition detectable in a communication network is provided. The method includes generating first derived communication attributes from collected statistics from the communication network in a first time interval and retaining the first derived communication attributes. The method further includes generating second derived communication attributes from collected statistics from the communication network in a second time interval, comparing values for the first and the second derived communication attributes to generate a comparison result and utilizing the comparison result as a factor in determining a status of the error condition.

16 Claims, 10 Drawing Sheets

```
*/
/*
SECTION 1:
Error types in this section are used to check the integrity
of the system
*/
        Error Percentage           MAJOR      25
        Difference
        Aggregated File Size       MINOR       1
        Difference
        Missing Aggregated         CRITICAL    1
        Statistics File
/*
SECTION 2:
Error types in this section are the errors that occur during
statistics collection
*/
        No Time                    MAJOR       1
        Object Down                MAJOR      12
        Communication Error        MAJOR      10
        New Object                 MAJOR       0
        Out of Memory              MAJOR       0
        Cannot Open Socket         MAJOR       0
        Too Many Retries           MAJOR       1
        Timeout                    MAJOR      20
        Could Not Enable           MAJOR       0
        Unknown Failure            MAJOR       0
        No Such Object             MAJOR       0
```

Exemplary Configuration File 304

Table 400

| Error Type | Description |
|---|---|
| 402 — Error Percentage Difference | If the percentage difference between the number of errors detected in the current interval and the number of errors detected in the previous interval is more than the threshold, a fault is generated. |
| 404 — Aggregated File Size Difference | If the number of statistics records in the aggregated statistics file for the current interval is less than the number of statistics records in the aggregated statistics file for the previous interval of the same duration, a fault is generated. |
| 406 — Missing Aggregated Statistics File | If the aggregated statistics file has not been created for an interval, a fault is generated. |

Figure 4

| Error Type | Description |
|---|---|
| No Time | Not enough time to collect data in the current interval. |
| Object Down | The object was down, no data was collected. |
| Communication Error | Communication error while retrieving data from the object. |
| New Object | New object for the current interval, no data was collected. |
| Out of Memory | Insufficient memory |
| Cannot Open Socket | Unable to open a socket to the object. |
| Too Many Retries | Too many retries. |
| Timeout | Object did not reply within the timeout period. |
| Could Not Enable | Statistics Collector could not turn on the statistics for an object. |
| Unknown Failure | Unknown failure. |
| No Such Object | No such object. |

Table 500
502
504

Figure 5

```
*/
/*
SECTION 1:
Error types in this section are used to check the integrity
of the system
*/

Error Percentage          MAJOR       25
    Difference

Aggregated File Size      MINOR       1
    Difference

Missing Aggregated        CRITICAL    1
    Statistics File
/*
SECTION 2:
Error types in this section are the errors that occur during
statistics collection
*/
    No Time                   MAJOR       1
    Object Down               MAJOR       12
    Communication Error       MAJOR       10
    New Object                MAJOR       0
    Out of Memory             MAJOR       0
    Cannot Open Socket        MAJOR       0
    Too Many Retries          MAJOR       1
    Timeout                   MAJOR       20
    Could Not Enable          MAJOR       0
    Unknown Failure           MAJOR       0
    No Such Object            MAJOR       0
```

Exemplary Configuration File 304

Figure 6

| 724 | 726 | 728 | 730 | 732 | 734 | 736 | 738 | 720 | 722 |
|---|---|---|---|---|---|---|---|---|---|
| Interval | No Time | Object Down | Communication Error | Too Many Retries | Timeout | Error Percentage Difference | Aggregated File Size Difference | Total Errors | Total Number of Statistics |
| 1 | 5 | 0 | 0 | 0 | 0 | 0 | 0 | 10 | 102 |
| 2 | 0 | 15 | 15 | 0 | 0 | 1 | 1 | 40 | 100 |
| 3 | 0 | 0 | 11 | 7 | 21 | 0 | 0 | 40 | 100 |
| 4 | 2 | 13 | 0 | 0 | 0 | 0 | 0 | 15 | 150 |
| 5 | 0 | 13 | 0 | 0 | 21 | 1 | 0 | 37 | 100 |
| 6 | 10 | 0 | 0 | 0 | 0 | 0 | 1 | 10 | 98 |
| 7 | 3 | 0 | 0 | 7 | 0 | 0 | 0 | 10 | 98 |
| 8 | 0 | 15 | 0 | 3 | 27 | 0 | 1 | 46 | 145 |

Exemplary Error Log File 308

Figure 7

| | 802 | 804 | 806 | 808 | 810 | 812 | 814 | 816 | 818 |
|---|---|---|---|---|---|---|---|---|---|
| | Interval | No Time | Object Down | Communication Error | Too Many Retries | Timeout | Total Errors | Total Number of Statistics | Error Percentage |
| 820 | 1 | 5 | 0 | 0 | 0 | 5 | 10 | 102 | 9.8 |
| 822 | 2 | 0 | 15 | 15 | 0 | 10 | 40 | 100 | 40 |
| 824 | 3 | 0 | 1 | 11 | 7 | 21 | 40 | 100 | 40 |
| 826 | 4 | 2 | 13 | 0 | 0 | 0 | 15 | 150 | 10 |
| 828 | 5 | 0 | 13 | 3 | 0 | 21 | 37 | 100 | 37 |
| 830 | 6 | 10 | 0 | 0 | 0 | 0 | 10 | 98 | 10.2 |
| 832 | 7 | 3 | 0 | 0 | 7 | 0 | 10 | 98 | 10.2 |
| 834 | 8 | 0 | 15 | 1 | 3 | 27 | 46 | 145 | 31.7 |

Table 800

SYSTEM AND METHOD FOR COLLECTING STATISTICS FOR A COMMUNICATION NETWORK

FIELD OF THE INVENTION

The invention relates generally to data communications, and more particularly to a system and method for collecting statistics for a communication network.

BACKGROUND OF THE INVENTION

Communication networks comprise a plurality of nodes, or switches, which are interconnected to form a web of nodes. Users communicate with other users in the network by transmitting messages and data through the network. Data is routed or switched through a path of connected nodes from the node associated with the sender to the node associated with the recipient.

Each node may maintain a set of statistics relating to the network traffic passing therethrough. Statistics include performance, usage or billing data collected from a communication network. The statistics may be used for billing purposes, evaluation of network performance at a node and fault diagnostics that may be present about a node. Typically, statistics are tracked using software modules which accumulate statistics in counters or registers internal to the nodes. The counters may be embodied in hardware or software using techniques known in the art. Generally, to conserve resources, the counters maintain only recent data. Further, the counters may be configured to be reset after a predetermined time period or interval. Typical reset intervals are 15 minutes, 60 minutes and 24 hours. The counter occupies a portion of memory on the node to store data from the previous interval while compiling data for the current interval. At the end of the current interval, interval data is written over the memory contents for the previous interval. The counter for the current interval is reset and then begins to accumulate data for the current interval. As such, statistics must be collected in every interval to retain timely statistics.

In prior art systems, there are statistics collection systems for a communication network which typically send statistics requests to the network using various protocols such as the known simple network management protocol (SNMP), file transfer protocol (FTP) or other protocols appropriate for the nodes. A statistics collection system typically communicates with the network using a statistics collection unit. The statistics collection unit is typically external to the network and is connected to the network using a dedicated network management functionality communication link.

The statistics collection unit typically sends collected statistics to a statistics aggregation unit for aggregation. It also sends indications of errors encountered when collecting statistics to the statistics aggregation unit. An operator at a network administrator node of the network can then use the indications of errors in the file created by the statistics aggregation unit to maintain the network. Some statistics collection systems of the prior art may use an error monitor to indicate errors in statistics collection. The error monitor may communicate with the network manager to raise an alarm if a certain number of errors are encountered. Even with the error monitor in place, it may not be able to track errors that indicate a problem with the integrity of the statistics collection system. These errors may include non-collection of statistics from nodes in the network.

There remains a need for a system and method for collecting statistics for a communication network which identifies integrity errors of the statistics collection system.

SUMMARY OF THE INVENTION

In a first aspect, a method of tracking an error condition detectable in a communication network is provided. The method includes generating first derived communication attributes from collected statistics from the communication network in a first time interval and retaining the first derived communication attributes. The method further includes generating second derived communication attributes from collected statistics from the communication network in a second time interval, comparing values for the first and the second derived communication attributes to generate a comparison result and utilizing the comparison result as a factor in determining a status of the error condition.

The method may also include initiating an alarm to the communication network when the status of the error condition indicates an error.

The comparison result may be determined utilizing the values for the first derived communication attributes, the values of the second derived communication attributes and a threshold value relating limits for deviations of the second derived communication attributes from the first derived communication attributes.

The comparison result may be determined utilizing a difference of the values of the second derived communication attributes from the values of the first derived communication attributes.

The comparison result may be determined utilizing a percentage change between the values for the second derived communication attributes from the values of the first derived communication attributes.

In a second aspect, an error monitor for tracking an error condition detectable in a communication network is provided. The error monitor includes a generation unit generating first derived communication attributes from collected statistics from the communication network in a first time interval and second derived communication attributes from collected statistics from the communication network in a second time interval. The error monitor further includes a storage device for storing the first derived communication attributes and a comparison module comparing values for the first and the second derived communication attributes to generate a comparison result. The comparison result is utilized as a factor in determining a status of the error condition.

In a third aspect, a method of tracking an error condition detectable in a communication network is provided. The method includes transmitting at least one statistic collected from the communication network in a time interval to an aggregation unit for inclusion in an aggregated statistics file for the time interval and determining existence of the aggregated statistics file for the time interval. The existence of the aggregated statistics file for the time interval is utilized as a factor in determining a status of the error condition.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF AN EMBODIMENT

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Briefly, the statistics collection system of the embodiment identifies errors in the collection of statistics and communicates with the network manager to raise alarms of those errors. Errors identified include errors in the collection of statistics itself or errors indicating a problem with the integrity of the statistics collection system of the embodiment.

First, a description of a network employing a statistics collection system of the prior art is provided followed by a description of the network employing a statistics collection system of the embodiment. Following, an example is provided identifying and indicating errors in the collection of statistics by the statistics collection system of the embodiment. Finally, two exemplary configurations of the error monitor in the statistics collection system are provided.

Figure 1:
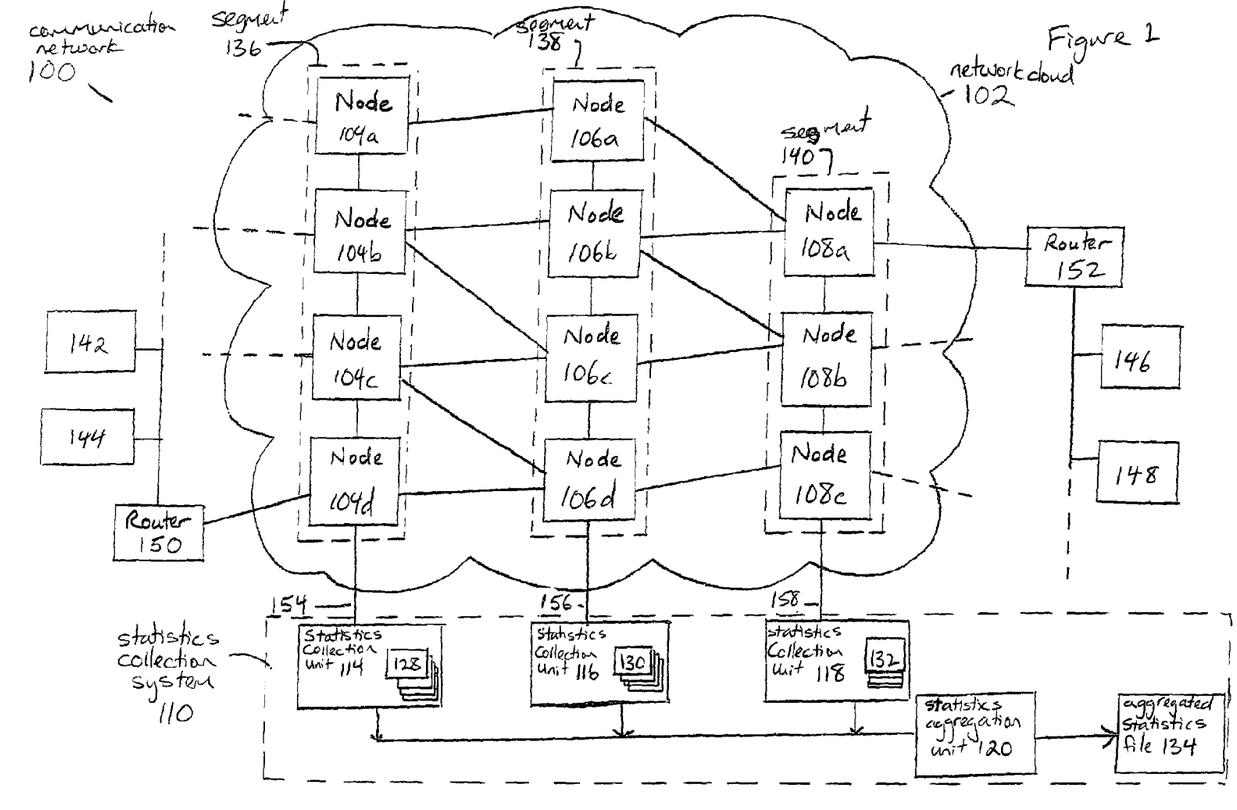
FIG. 1 is a block diagram of a communication network having a statistics collection system of the prior art.

Now referring to FIG. 1, prior art data communication network 100 provides the capability for compiling statistics that are recorded by various nodes included within communication network 100. Communication network 100 comprises network cloud 102 which includes a plurality of interconnected nodes, or switches, 104, 106 and 108. Statistics collection system 110 for network cloud 102 comprises statistics collection units 114, 116 and 118 and a statistics aggregation unit 120. Statistics collection units 114, 116 and 118 generate statistics files 128, 130 and 132, respectively. Statistics aggregation unit 120 generates aggregated statistics file 134.

It will be appreciated that network cloud 102 may be any packet switched network. For example, network cloud 102 may utilize asynchronous transfer mode (ATM) protocol for communication. In an ATM network, nodes 104, 106 and 108 may be ATM nodes or switches.

Nodes 104, 106 and 108 in network cloud 102 are grouped into segments, or subnets, 136, 138 and 140. First segment 136 includes nodes 104; second segment 138 includes nodes 106; and third segment 140 includes nodes 108.

End users 142, 144, 146 and 148 may be connected to network cloud 102 via routers 150 and 152, allowing data to be transmitted amongst end users 142, 144, 146 and 148 through nodes 104, 106 and 108 in network cloud 102. For example, a packet may be sent from end user 144 to end user 146 by sending it from end user 144 to router 150, to network cloud 102, to router 152 and finally to end user 146.

As is illustrated, each of node segments 136, 138 and 140 operably communicates with its associated statistics collection unit 114, 116 and 118. Statistics collection units 114, 116 and 118 may communicate with node segments 136, 138 and 140 via dedicated network management functionality communication links 154, 156 and 158. Each statistics collection unit 114, 116 and 118 is responsible for gathering the appropriate statistics within its associated node segment 136, 138 and 140 in one or more statistics files 128, 130 and 132. Statistics collection units 114, 116 and 118 typically use a general purpose computer with specialized network management software operating thereon which gathers and analyzes statistics from their segments 136, 138 and 140.

The following description refers to statistics collection unit 118, link 158, segment 140, and nodes 108 to illustrate aspects of the embodiment within a segment of network cloud 102. It will be appreciated that the same general description will apply to statistics collection unit 114, link 154, segment 136, and nodes 104 and statistics collection unit 116, link 156, segment 138, and nodes 106.

Figure 2:
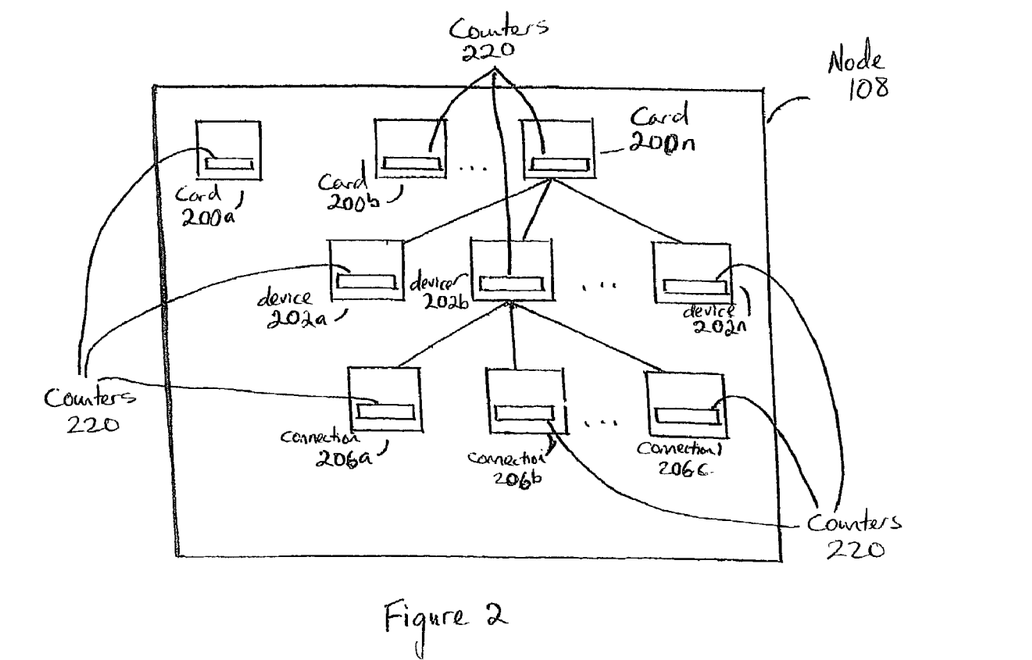
FIG. 2 is a block diagram of a node and its subcomponents in the communication network of FIG. 1.

Referring to FIG. 2, each node 108 in segment 140 may include a number of subcomponents. The hierarchical structure of each node 108 may include a number of cards 200a, 200b, ... 200n, where the cards 200 may process communications utilizing a number of devices 202a, 202b, ..., 202n, and where the devices 202 may each support a number of connections, 204a, 204b, ... 204n. A card 200 is a physical entity having a number of devices 202. A device (or port) 202 is a physical or logical entity that groups connections 204. Connections 204 carry user data and are dynamically made between devices 202 by the controlling software on node 108. There may be many connections 204 per device 202.

As described earlier, traffic transmitted through network cloud 102 may be monitored using counters which store a set of statistics relating to traffic flow through the nodes and possibly other characteristics of the node. As such, each of the objects (node 108, card 200, device 202, connection 204) may include specific counters 220 for collecting statistics for that particular object. Statistics requests from statistics collection unit 118 may be targeted at a particular counter 220 within a particular object within each associated node 108 of each request. Counters 220 may be embodied in hardware, software or other means known in the art. Typically, counters 220 are reset after a predetermined time interval regardless as to whether or not their data has been collected. If data from counters 220 are not collected in each interval, some data will be lost and the overall statistics collection process will produce incomplete or inaccurate results.

Referring to FIG. 1, statistics collection units 114, 116 and 118 are provided with information by a statistics management unit (not shown) concerning the objects required to determine the protocol, frequency of polling and other parameters needed for the requests. When statistics collection unit 118 receives this information, statistics collection unit 118 will form and send statistics requests to nodes 108 in node segment 140. Each individual request from statistics collection unit 118 is associated with, i.e. addressed to, a node 108 in segment 140 from which it requests statistics. It will be appreciated that statistics requests sent to the various nodes in network cloud 102 may be sent using SNMP or other polling protocols. It will be appreciated that statistics collection unit 118 may use appropriate software and/or hardware modules for processing requests to nodes 108 in its segment 140. As described previously, statistics collection unit 118 typically uses a general purpose computer with specialized network management software operating thereon. However, other embodiments of a statistics collection unit 118 may have hardware embodied in customized circuitry, an ASIC, a microcontroller, and other electronics. The software may be embodied in one or more computer programs executing on one or many elements in the hardware.

Statistics are sent from nodes 108 to statistics collection unit 118 in response to scheduled polling and event driven collection. In scheduled polling, the statistics collection unit 118 periodically sends requests to nodes 108 to respond with requested data. The requests may be sent at regular or irregular intervals. In event driven collection, requests are not sent by statistics collection unit 118. In event driven collection, statistics collection unit 118 initially enables the node 108 for collection then the node 108 periodically spools the data automatically to statistics collection unit 118.

When nodes 108 respond to the outstanding sent statistics requests, the responses are received by statistics collection unit 118 and stored in one or more statistics files 132. Statistics collection unit 118 may store the responses in a separate statistics file 132 for each protocol on which statistics were requested. Statistic collection unit 118 sends the information contained in all of its statistics files 132 to statistics aggregation unit 120 in each interval. Statistics aggregation unit 120 compiles this information in an aggregated statistics file 134 for all protocols in an interval for the purposes of billing, evaluation of network performance at a node and fault diagnostics. One aggregated statistics file 134 is created for each interval. Statistics file 132 may be stored in non-volatile memory systems such as a hard drive or electrically erasable PROMs. Alternatively, but not preferably, statistics file 132 may be stored in a volatile memory device, such as RAM.

Hardware and software failures, link failures, maintenance actions and other events may prevent a statistics collection unit 114, 116 and 118 from collecting a statistic in an interval. For example, a node 104, 106 and 108 may not respond to a statistics request from its statistics collection unit 114, 116 and 118 if its communication link 154, 156 or 158 is down or if the node 104, 106 and 108 is down or is too busy to respond to the request. Since statistics are overwritten by nodes 104, 106 and 108 in each interval, if statistics are not collected, statistics collection units 114, 116 and 118 may collect incomplete information. To identify when a statistic was not collected for an interval, a statistics collection unit 114, 116 and 118 identifies statistics requests in its associated statistics file 128, 130 and 132 for which it did not receive a response. Statistics collection units 114, 116 and 118 also record in statistics files 128, 130 and 132 the type of error which caused the lack of response to the statistics request. This information in statistics files 128, 130 and 132 is sent to aggregated statistics file 134 along with the statistics gathered from successful statistics requests. An operator can then identify errors resulting in incomplete statistical information from aggregated statistics file 134. This information can in turn be used to maintain nodes 104, 106 and 108 in network cloud 102. However, often the aggregated statistics file 134 is not regularly checked for network faults resulting in incomplete statistics gathering. One consequence of prolonged faults leading to loss of statistics is loss of revenue because the fault prevented the gathering of billing information.

The statistics collection system of the embodiment provides an error monitor to indicate faults in a timely manner. The error monitor reviews the aggregated statistics file 134 and reports on faults in collecting statistics and on faults that indicate an integrity problem with the statistics collection system.

Figure 3:
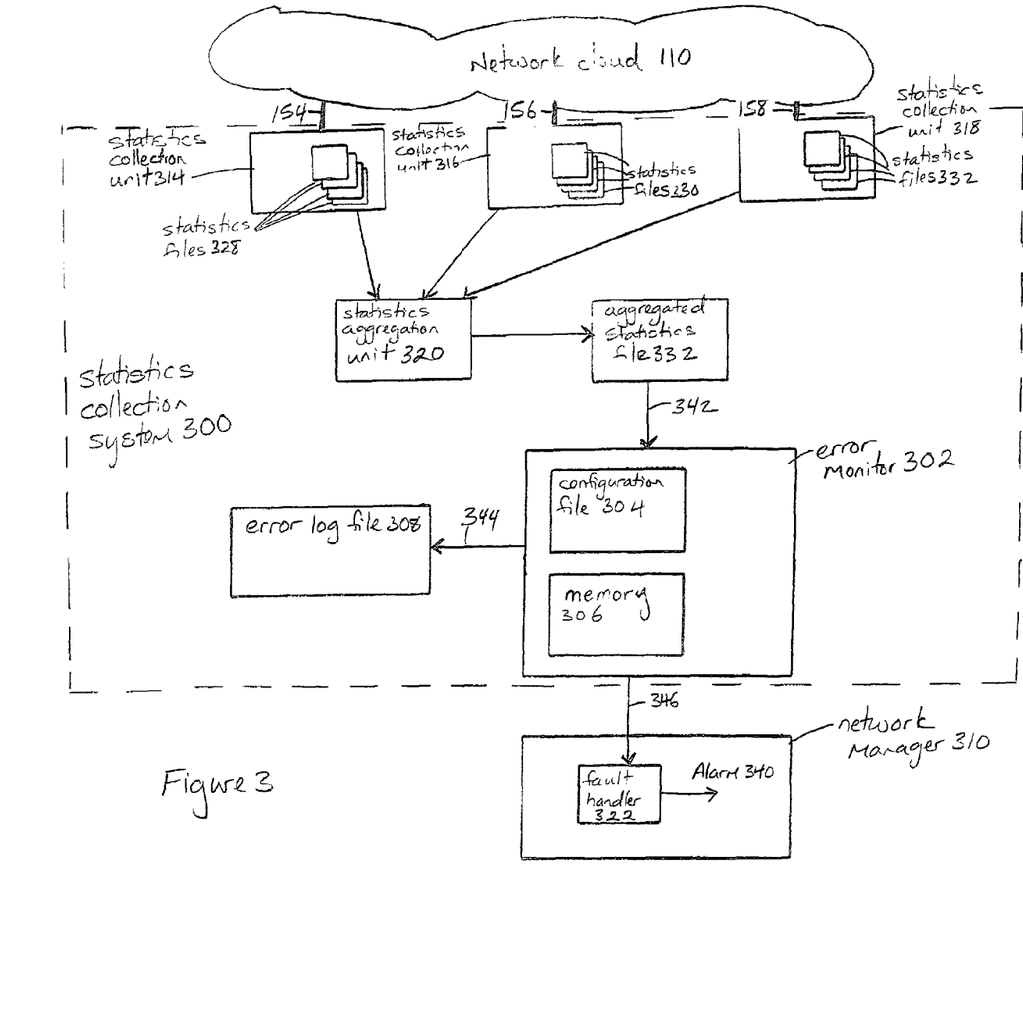
FIG. 3 is a block diagram of a communication network with a statistics collection system of the embodiment.

Referring to FIG. 3, a statistics collection system 300 of the embodiment for network cloud 102 is illustrated. Statistics collection system 300 comprises statistics collection units 314, 316 and 318, statistics aggregation unit 320, aggregated statistics file 334, error monitor 302 and error log file 308. Error monitor 302 has configuration file 304 for configuring error monitor 302 and memory 306 to assist in tracking integrity errors in statistics collection system 300. Error monitor 302 communicates with error log file 308, indicated by arrow 344 to record statistics collection errors. Error monitor 300 also communicates with fault handler 322 of network manager 310 to indicate statistics collection errors to the operator.

Statistics collection units 314, 316 and 318, statistics aggregation unit 320 and aggregated statistics file 334 are the same as statistics collection units 114, 116 and 118, statistics aggregation unit 320 and aggregated statistics file 134 above and function as is described in relation to statistics collection system 110, statistics collection units 314, 316 and 318 generating one or more statistics files 128, 130 and 132 for aggregation by statistics aggregation unit 320 into aggregated statistics file 334. Although three statistics collection units 314, 316 and 318 are shown in the illustrated statistics collection system 300, it will be appreciated that there may be more or less in another statistics collection system 300. The statistics collection system 300 of the embodiment supports up to 20 statistics collection units reporting to a statistics aggregation unit 320.

Error monitor 302 is provided with a configuration file 304. Configuration file 304 contains data used by error monitor 302 to indicate which types of errors to monitor in aggregated statistics file 334 and when to report to the operator that such errors have occurred. These types of errors fall into two categories: integrity error types and collection error types.

Figure 4:
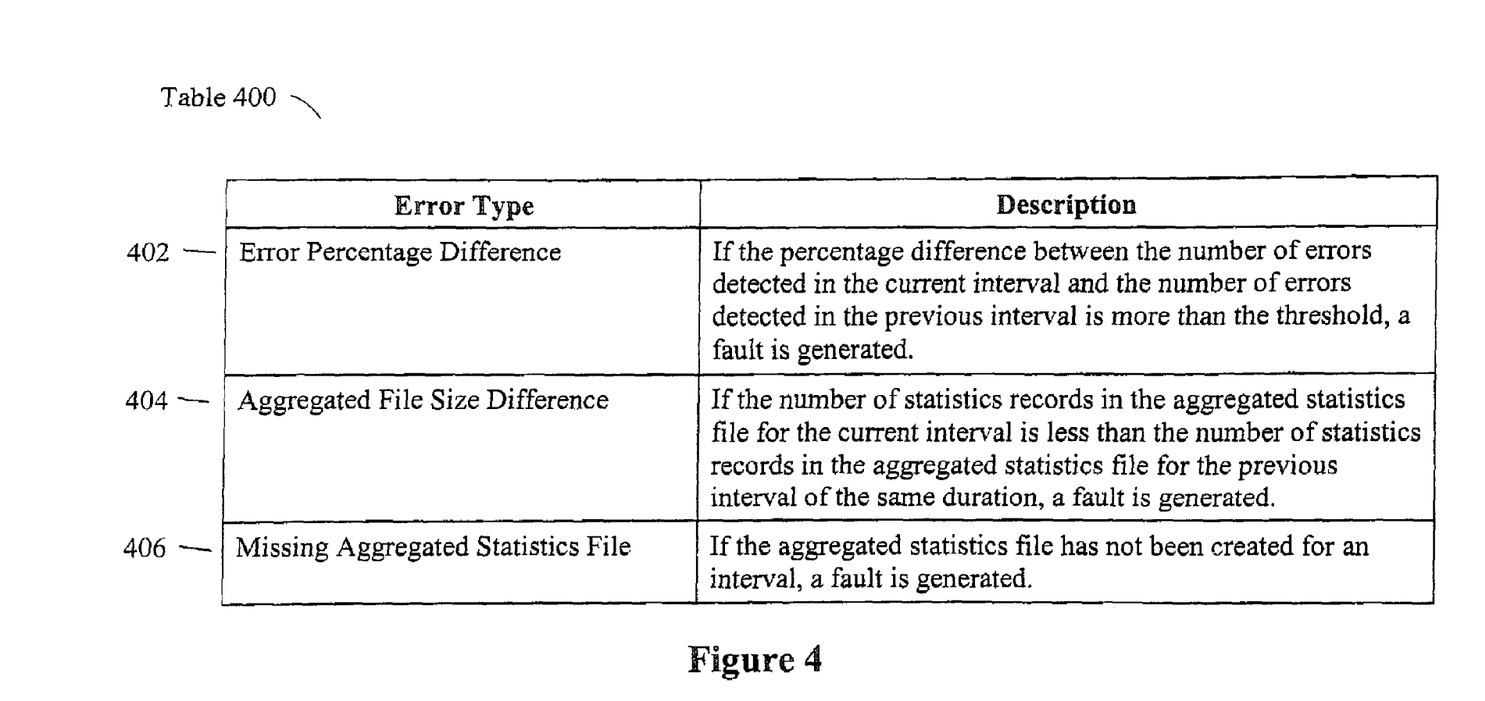
FIG. 4 is a table of integrity error types identified by the statistics collection system of FIG. 3.

Integrity error types indicate errors affecting a large portion of network cloud 102, such as a recent increase in the percentage of errors, or those that may indicate a problem with the statistics collection system, such as collecting fewer statistics than the previous interval. Some integrity errors compare derived communication attributes from errors detected in a previous interval with derived communication attributes from errors detected in the current interval to determine if an integrity error has occurred. Referring to FIG. 4, table 400 of integrity error types is provided. Row 402 of table 400 describes the "Error Percentage Difference" error type. This error type tracks recent increases in the percentage of errors detected when collecting statistics.

Error monitor 302 detects this error type by storing the derived communication attribute indicating the percentage of errors in the previous interval. It then calculates the derived communication attribute indicating the percentage of errors in the current interval and subtracts the percentage of errors in the last interval from the percentage of errors in the current interval.

Row 404 of table 400 describes the "Aggregated File Size Difference" error type. This error type tracks situations where fewer statistics are gathered for an interval than the previous interval of the same duration. This may occur, for example, when the operator unintentionally disables statistics collection for a certain portion of network cloud 102. Error monitor 302 detects this error type also by storing the derived communication attribute indicating the number of statistics records in aggregated statistics file 334 from the previous interval of the same duration as the current interval. It then calculates the derived communication attribute indicating the number of statistics records in the aggregated statistics file 334 from the current interval and compares it with the derived communication attribute stored.

A third integrity error, the "Missing Aggregated Statistics File" is described in row 406 of table 400. Error monitor 302 detects this error when aggregated statistics file 334 has not been created for an interval.

Accordingly, analysis of the derived communication attributes and the statistics records may provide an operator with information indicating a source of a problem in the network. For example, if the operator mistakenly configures the statistics collection system 300 to not collect statistics from a particular node, then in comparing sequential derived communication attributes, the embodiment can report and analyze the potential source of the problem, including prompting the operator to determine whether the statistics collection for that node should be re-engaged. Other reports may be used to indicate a problem in network cloud 102.

It will be appreciated that other integrity error types for detecting integrity errors in a statistics collection system 300 of the embodiment may be provided.

Figure 5:
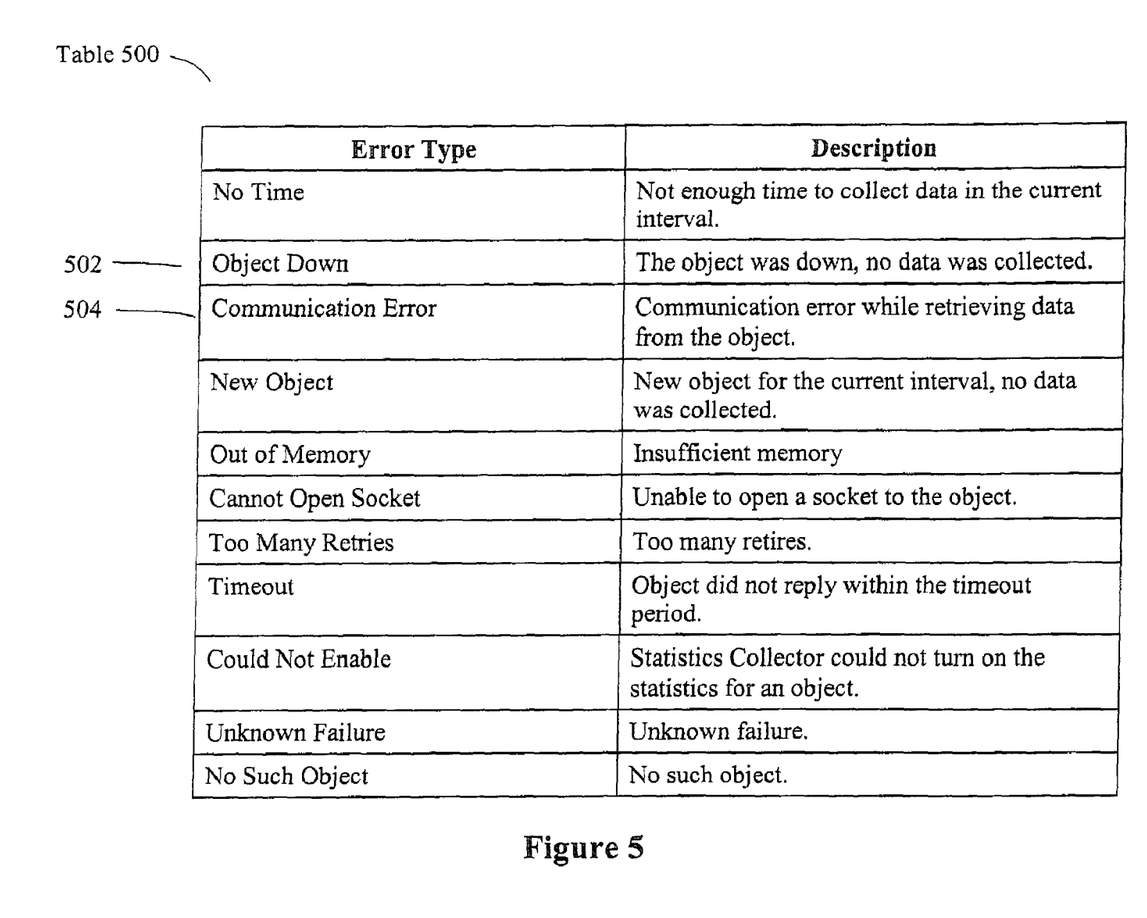
FIG. 5 is a table of collection error types identified by the statistics collection system of FIG. 3.

Referring to FIG. 5, table 500 of collection error types is provided. Row 502 describes the "Object Down" error type. An "Object Down" error type occurs when the object in network cloud 102, i.e. node, card, device or connection, does not respond to the statistics request and is presumed to be unavailable. The statistics collection unit 314, 316 and 318 detects this error type and indicates it in its associated statistics file 328, 330 and 332 with the failed statistics request. This information is passed along to aggregated statistics file 334 by statistics aggregation unit 320. Row 504 describes "Communication Error" error type. This error type occurs when a communication error occurs in retrieving statistics from an object. The occurrence of this error is similarly recorded in the appropriate statistics file 328, 330 and 332 and passed along to aggregated statistics file 334. It will be appreciated that other collection error types for detecting collection errors by a statistics collection system 300 of the embodiment may be provided.

Figure 6:
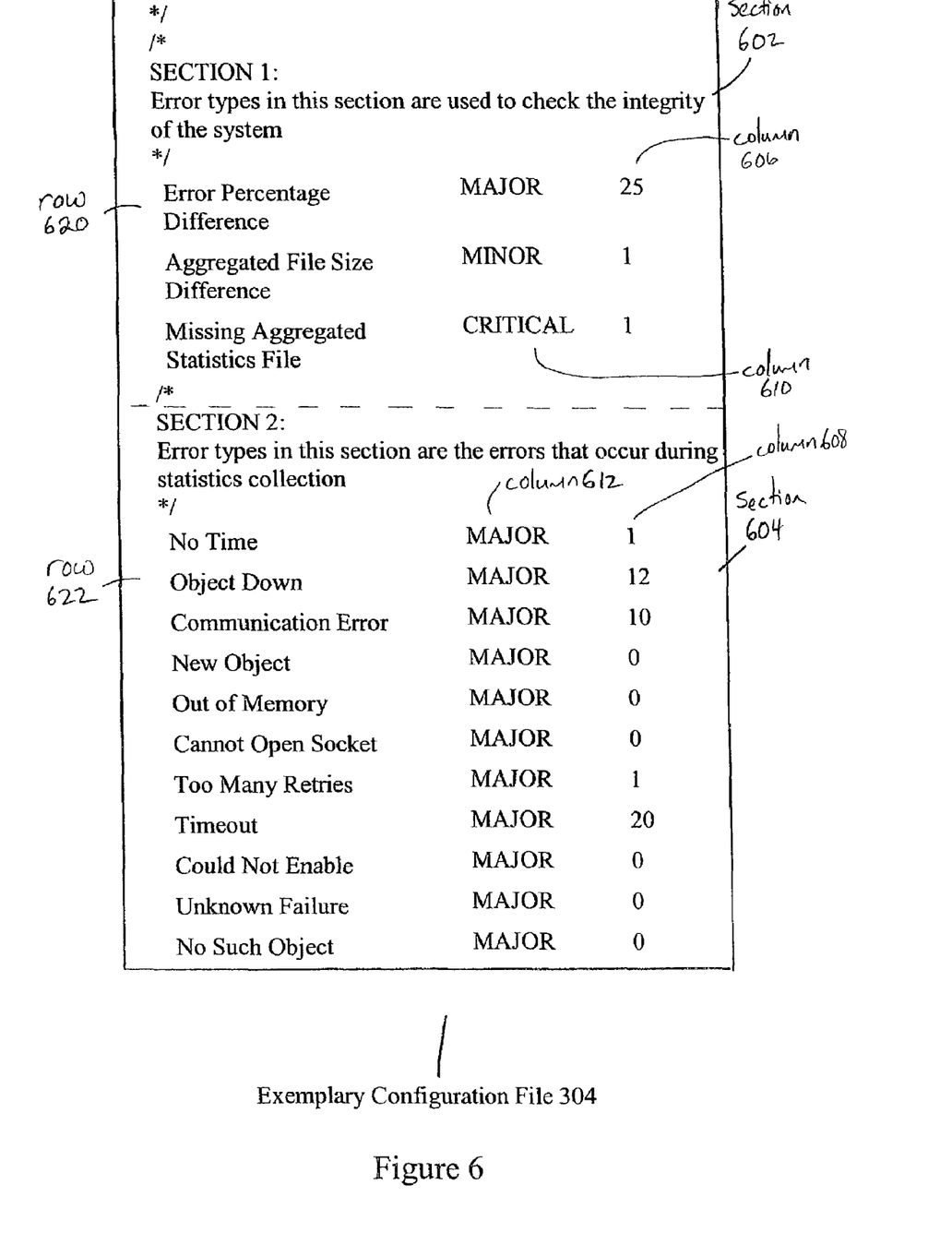
FIG. 6 is an exemplary configuration file for an error monitor in the statistics collection system of FIG. 3.

Referring to FIG. 6, an exemplary configuration file 304 is illustrated. Configuration file has two sections 602 and 604. Section 602 lists integrity errors, such as those described for FIG. 4, to be monitored by error monitor 302. Section 604 lists collection errors, such as those described for FIG. 5, to be monitored by error monitor 302.

Each integrity error and collection error is associated with a threshold value, indicated in columns 606 and 608 respectively. Error monitor 302 uses the threshold value to determine if an alarm should be raised for this error type. For example, for "Error Percentage Difference" error type, column 606 of row 620 indicates that if the error percentage for the current interval increases by 25% (calculated by subtracting the current percentage from that of the previous interval), error monitor 302 will communicate with network manager 310 to raise an alarm, described later. For "Object Down" error type, column 608 of row 622 indicates that if more than "12" errors of this type occur in an interval, error monitor 302 will communicate with network manager 310 to raise an alarm, described later. Error monitor 302 does not search in aggregated statistics file for error types with a threshold value of "0". The threshold values in configuration file 304 are user configurable.

Also, each integrity error and collection error is associated with a priority value, indicated in columns 610 and 612 respectively. This priority is used by network manager 310 when alarms are raised, described later. The priority values in configuration file 304 are user configurable.

Referring again to FIG. 3, after statistics aggregation unit 320 aggregates statistics into aggregated statistics file 334, error monitor 302 reviews the contents of aggregated statistics file 334, indicated by arrow 342, searching for types of errors as indicated in configuration file 304. If aggregated statistics file 334 for an interval does not exist and an entry in configuration file 304 indicates that the presence of aggregated statistics file 334 should be monitored, error monitor 302 communicates with network manager 310 to raise an alarm for this error indicating the error condition. This error condition is indicated in error log file 308 using the entry for "Aggregated File Size Difference" error type, the file size effectively being zero for the interval. It will be appreciated that other methods of indicating this error condition may be used including having a separate entry in error log file 308 to indicate the error condition.

If aggregated statistics file 334 for an interval exists, error monitor 302 calculates the count for each type of error monitored and the total number of errors of all types, including types not monitored by error monitor 302. Error monitor 302 calculates derived communication attributes such as the total number of statistics records in aggregated statistics file 334 and the percentage of errors for this interval from the total number of errors and the total number of statistics records in aggregated statistics file 334.

Some types of errors, such as "Error Percentage Difference" and "Aggregated File Size Difference", monitored by error monitor 302 are detected by comparing current derived communication attributes with derived communication attributes gathered from a previous interval. Derived communication attributes required for these comparisons are stored by error monitor 302 in memory 306. In this embodiment, error monitor 302 stores the error percentage from the last interval and the total number of statistics recorded in aggregated statistics file 334 from the last interval for each interval type in memory 306. For example, if statistics collection system 300 uses intervals of 15 minutes, 60 minutes and 24 hours, three values for total number of statistics is stored in memory 306, one for each of these intervals. It will be appreciated that memory 306 may store other derived communication attributes than those listed above which may be used by error monitor 302 to detect other types of integrity errors. It will also be appreciated that error monitor 302 may store derived communication attributes in non-volatile memory systems such as a hard drive or electrically erasable PROMs.

Error monitor 302 retrieves derived communication attributes from a previous interval from memory 306 and compares it to the information from the current interval for these errors as described above. After this comparison, error monitor updates the derived communication attributes in historical file 306 with derived communication attributes from the current interval. For example, the error percentage from the previous interval is updated with that of the current interval. Also, the total number of statistics recorded in aggregated statistics file 334 for the last interval with the same duration as the current interval is updated with the total number of statistics recorded in aggregated statistics file 334 of the current interval.

Figure 7:
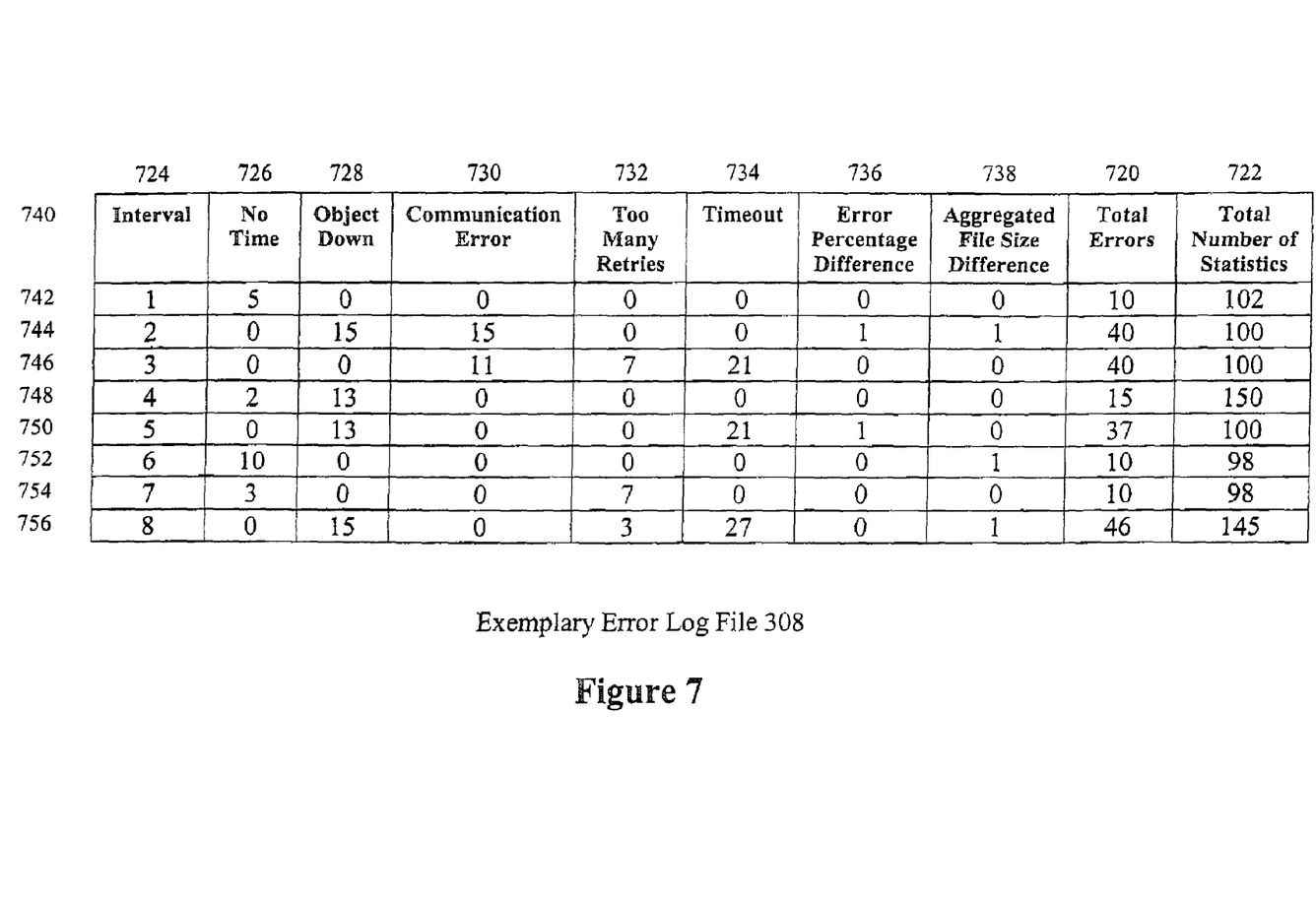
FIG. 7 is an exemplary error log file created by the error monitor of the statistics collection system of FIG. 3.

Error monitor 302 summarizes the errors detected and writes a summary record to error log file 308, indicated by arrow 344. Referring to FIG. 7, aspects of an exemplary error log file 308 is illustrated. Error log file 308 records the total number of errors detected in aggregated statistics file 334 (column 720) and the total number of statistics in the file (column 722). Error log file 308 also records the number of individual errors of each collection error type if the number is above the threshold indicated by configuration file 304 (columns 724 to 734). If the number of errors of a type is above this threshold, an error condition exists. As mentioned previously, error monitor 302 communicates with network manager 310 to raise an alarm if an error condition exists. If the number of an error type in an interval does not exceed its threshold, error log file 308 records a "0" value for the number of errors of this type and no error condition of this type exists. The number of errors of an error type which is below the threshold is counted in the total errors recorded in column 720.

Error log file 308 also records the status of the error conditions for the "Error Percentage Difference" and the "Aggregated File Size Difference" using a boolean value. An error of this type encountered in an interval is indicated by the value "1" in the appropriate column 736 or 738. As mentioned previously, error monitor 302 communicates with network manager 310 to raise an alarm if it encounters such an error. The value "0" in the appropriate column 736 or 738 indicates that this error was not encountered in the interval. Error log file 308 reveals the integrity and collection error conditions that have caused alarms in the interval, indicated by the non-zero entries for the summary record for an interval.

Referring again to FIG. 3, if error monitor 302 identifies that an error type should be reported to the operator because it has exceeded the threshold in configuration file 304 (columns 606 and 608 of FIG. 6), it sends a message of the fault to fault handler 322 of network manager 310, indicated by arrow 346. This message includes the priority of the error type as indicated in configuration file 304 (columns 610 and 612 in FIG. 6). Fault handler 322 raises alarms 340 of detected errors to a terminal (not shown). Fault handler 322 may use the priority of the fault indicated in the message to prioritize alarms 340. Alarms 340 are visible to the operator at the terminal.

Figure 8:
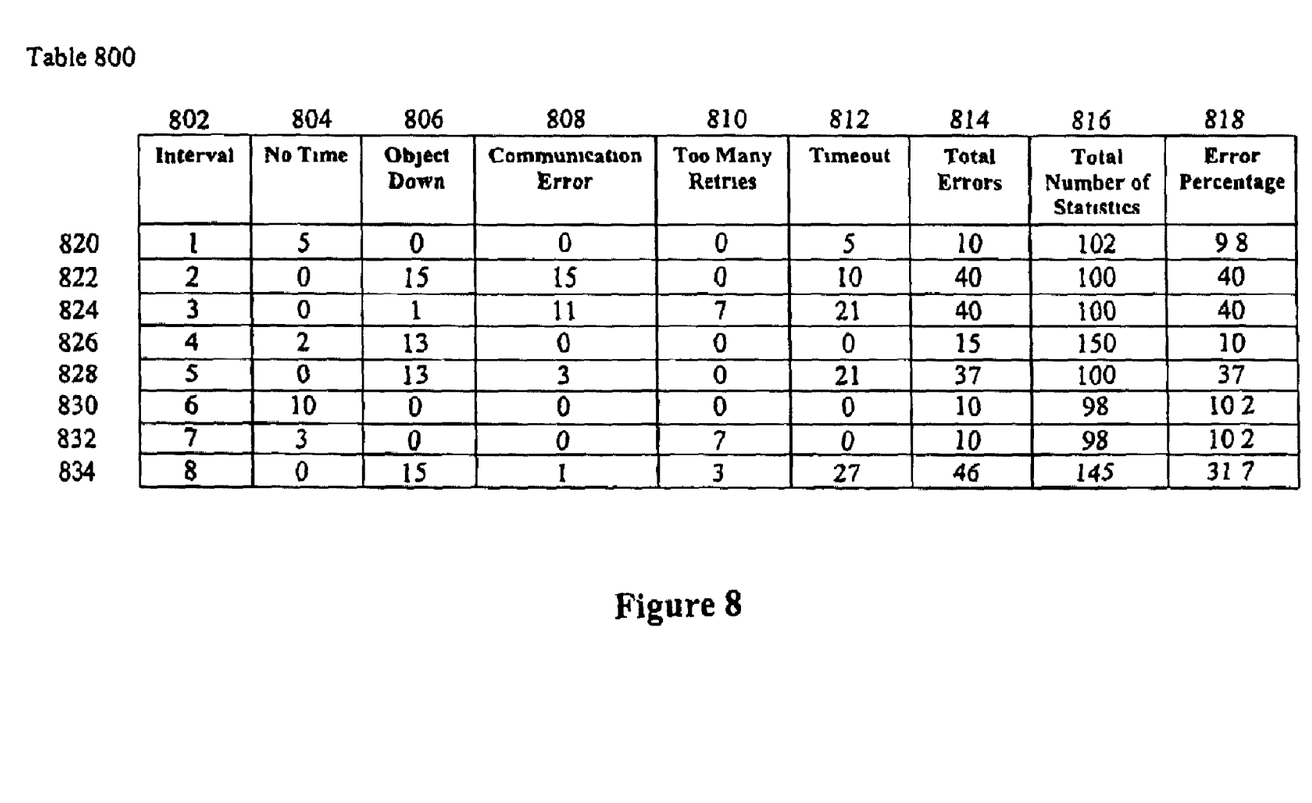
FIG. 8 is a table illustrating an example of errors identified by the statistics collection system of FIG. 3.

Referring to FIG. 8, table 800 illustrates an example of errors identified by statistics collection system 300. In this example, the collection error types and integrity error types are those monitored by the exemplary configuration file 304 shown in FIG. 6 and error monitor 302 produces exemplary error log file 308 shown in FIG. 7. Aggregated statistics file 334 is present for all intervals in the example.

Column 802 of table 800 indicates the interval in which errors were identified. Columns 804 to 812 indicate the number of collection error types encountered in an interval. Columns 814 and 816 indicate the total number of errors and the total number of statistics in an interval, respectively. Column 818 indicates the error percentage for the current interval, as calculated by error monitor 302, based on the values of columns 814 and 816.

In the example of FIG. 8, two interval lengths are used, 15 minutes and 60 minutes. Statistics collection units 314, 316 and 318 gather statistics every 15 minutes, every fourth time gathering statistics for the 60 minute interval. Therefore, in the example, intervals 1, 2 and 3 are 15 minute intervals, as are intervals 5, 6 and 7. Intervals 4 and 8 are 60 minute intervals in which statistics collection units 314, 316 and 318 gather hourly data from the objects.

Entries in row 820 track the errors encountered in the first interval. In interval 1, aggregated statistics file 334 indicates 5 errors of "No Time" error type (row 820, column 804) and 5 errors of "Timeout" error type (row 820, column 812) were detected. The total number of errors is 10 (row 820, column 814). There are 102 statistics records in aggregated statistics file 334 (row 820, column 816). The error percentage for this interval is 9.8% (row 820, column 818).

Error monitor 302 reviews aggregated statistics file 334 with reference to configuration file 304. Since the threshold of "Timeout" error type is 20 but only 5 were detected, error monitor 302 will not raise an alarm for this error type and will record a "0" in error log file 308 (row 742, column 734 in FIG. 7). This error type is counted in the total errors, indicated in row 742, column 720 of FIG. 7 where "10" total errors are reported. The number of "No Time" errors is over the threshold of 1 indicating an error conditions for this error type. Accordingly error monitor 302 communicates with network manager 310 to raise an alarm and records the number of errors of this type in error log file 308 (row 742, column 726 of FIG. 7). Since this is the first interval, no comparisons are made with previous intervals for error percentage or number of statistics gathered. Error monitor 302 stores the derived communication attributes such as the total number of statistics (row 820, column 816) and the error percentage (row 820, column 818) in memory 306.

Row 822 illustrates the errors encountered in the second interval. In interval 2, aggregated statistics file 334 indicates 15 "Object Down" errors (row 822, column 806), 15 "Communication Error" errors (row 822, column 808) and 5 "Timeout" errors (row 822, column 812) ere encountered. The total number of errors is 40 (row 822, column 814). There are 100 statistics records in aggregated statistics file 334 (row 822, column 816). The error percentage for this interval is 40% (row 822, column 818).

The number of "Object Down" and "Communication Error" errors are above their thresholds indicating an error condition for both of these error types. Accordingly, error monitor 302 communicates with network manager 310 to raise an alarm and inserts the number of errors of this type in error log file 308 (row 744, columns 728 and 730, respectively, of FIG. 7). Error monitor 302 reads the previous derived communication attributes such as the total number of statistics (102) and error percentage (9.8%) from memory 306 and compares these to the current interval. Error monitor 302 determines that the total number of statistics gathered has decreased from 102 to 100 from the current and historical data. Error monitor 302 communicates with network manager 310 to raise an alarm of this error type and inserts the value "1" in error log file 308 (row 744, column 738 of FIG. 7) to indicate an error condition for this error type. Error monitor 302 also detects that the error percentage has increased by more than the threshold value of 25% indicated by configuration file 304 (error monitor 302 calculates the percentage difference by subtracting the cur rent error percentage, 40%, from the previous error percentage, 9.8%). Error monitor 302 communicates with network manager 310 to raise an alarm of this error type and inserts the value "1" in error log file 308 (row 744, column 736 of FIG. 7) to indicate an error condition for this error type. Error monitor 302 again stores the derived communication attributes such as the total number of statistics (row 822, column 816) and the error percentage (row 822, column 818) in memory 306.

Error monitor 302 continues this process for intervals 3 and 4, indicted by rows 824 and 826 of table 800. In interval 5 (row 828 of table 800), aggregated statistics file 334 indicates 13 "Object Down" errors (row 828, column 806), 3 "Communication Error" errors (row 828, column 808) and 21 "Timeout" errors (row 828, column 812) were encountered. The total number of errors is 37 (row 828, column 814). There are 100 statistics records in aggregated statistics file 334 (row 828, column 816). The error percentage for this interval is 37% (row 828, column 818).

Error monitor 302 records error type numbers in error log file 308 and raises alarms of error conditions as described previously. Error monitor 302 reads the derived communication attributes indicating the previous total number of statistics from the interval as the same duration as the current interval, 15 minutes, from memory 306. Therefore, error monitor reads the value "100" from the third interval. It also reads the derived communication attributes indicating the error percentage from the previous interval (10%). It compares these values to those from the current interval. Error monitor 302 detects that the total number of statistics gathered is the same as interval 3. Error monitor 302 inserts the value zero (0) in error log file 308 (row 750, column 738 of FIG. 7). Error monitor 302 detects that the error percentage has increased by more than the threshold value of 25%. Error monitor 302 communicates with network manager 310 to raise an alarm of this error type and inserts the value "1" in error log file 308 (row 750, column 736 of FIG. 7) to indicate this error was encountered. Error monitor 302 again stores the derived communication attributes such as the total number of statistics and the error percentage in memory 306.

Error monitor 302 continues this process for intervals 6 and 7, indicted by rows 830 and 832 of table 800. For interval 8, indicated by row 834 of table 800, error monitor compares the total number of statistics (row 834, column 816) with that of the previous 60 minute interval, interval 4. Error monitor again raises alarms and inserts appropriate values in error log file 308 as described previously.

Figure 9:
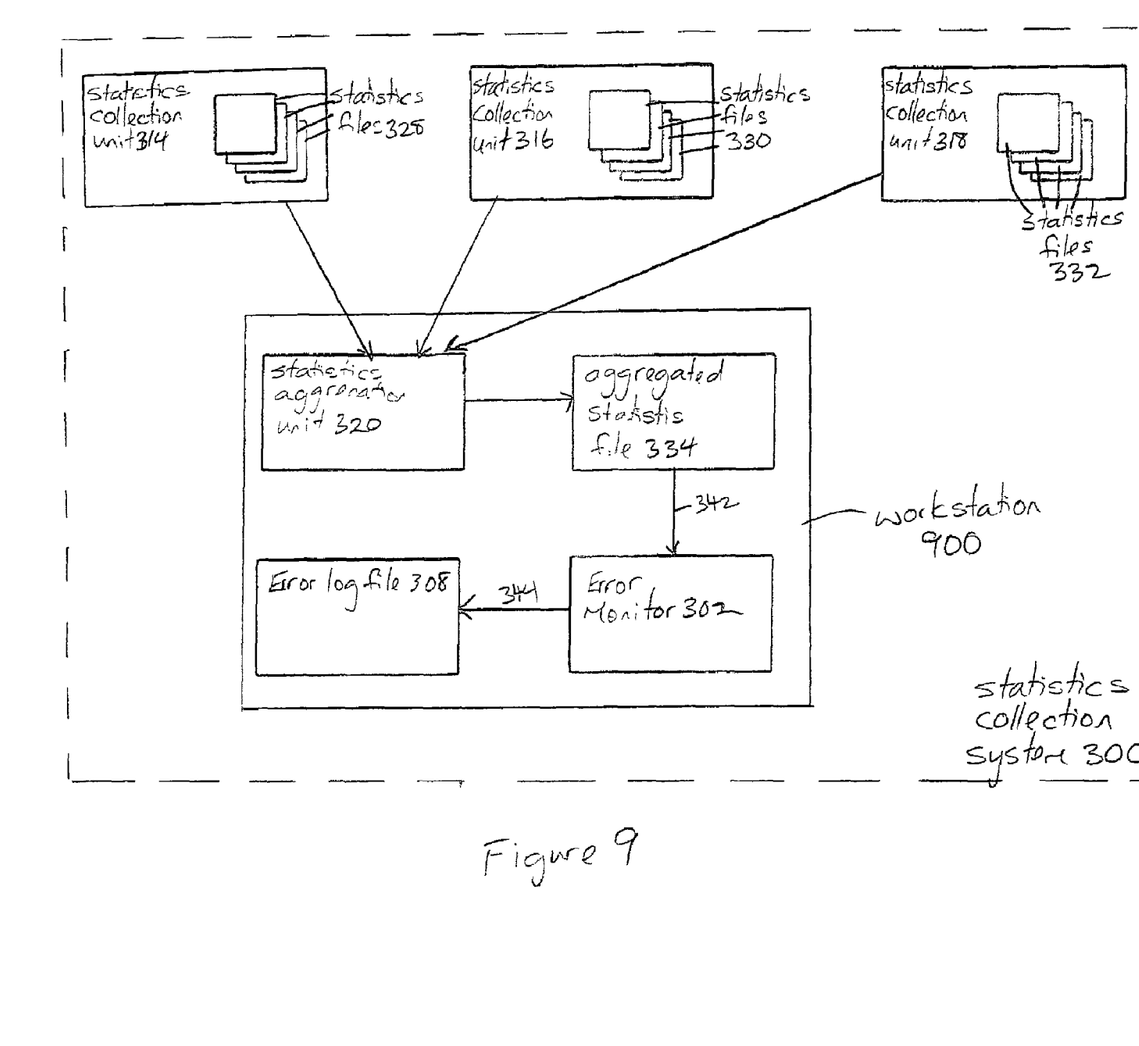
FIG. 9 is a block diagram illustrating a configuration of the error monitor in the statistics collection system of FIG. 3.
Figure 10:
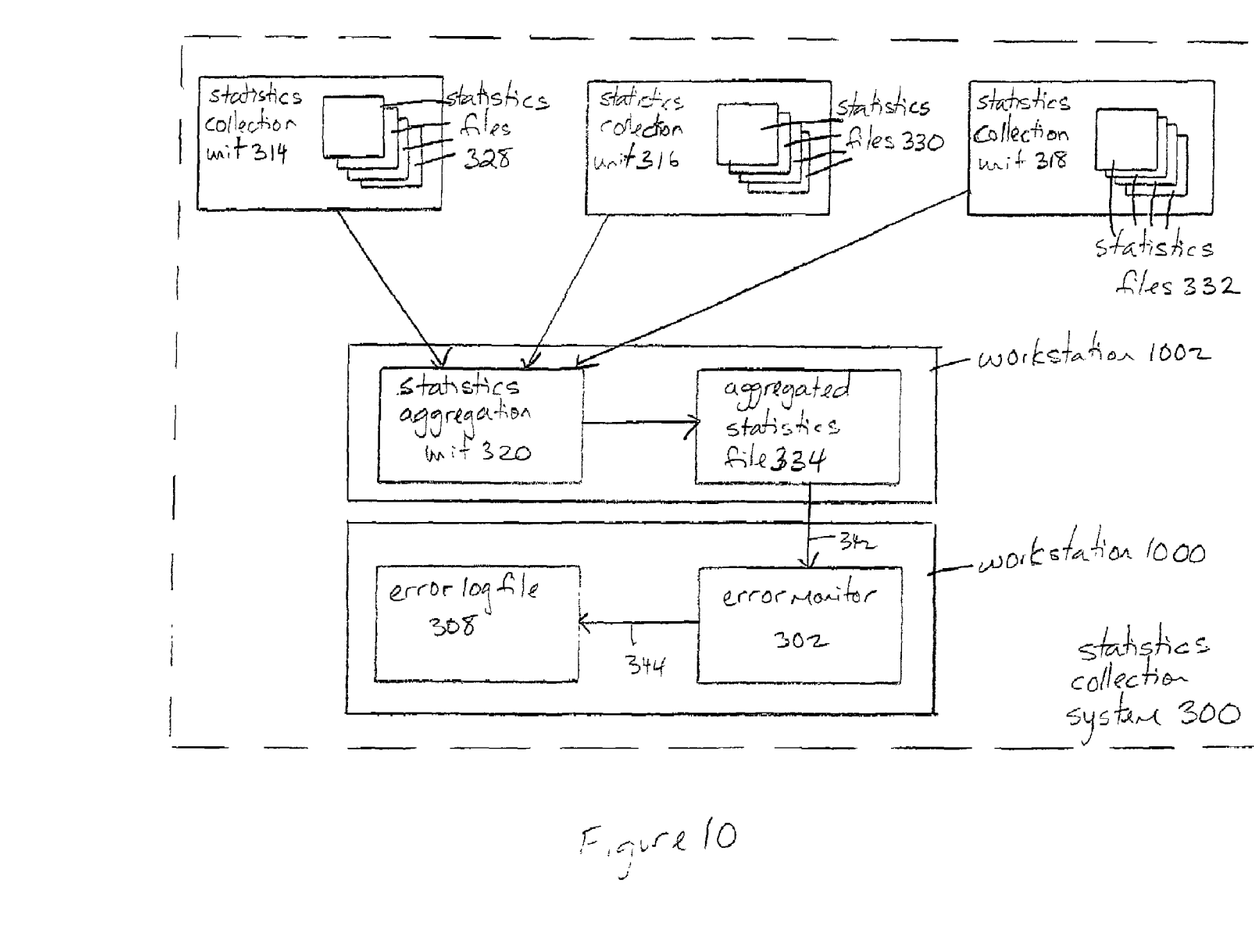
FIG. 10 is a block diagram illustrating another configuration of the error monitor in the statistics collection system of FIG. 3.

The software that comprises error monitor 302 as shown in FIG. 3 may reside on the same workstation as that of the software comprising statistics aggregation unit 320. This configuration for error monitor 302 is illustrated in FIG. 9 where error monitor 302 and statistics aggregation unit 320 are illustrated within workstation 900. Alternatively, the software that comprises error monitor 302 as shown in FIG. 3 may reside on a workstation separate from that of the software comprising statistics aggregation unit 320. This configuration is illustrated in FIG. 10 where error monitor 302 is illustrated within workstation 1000 and statistics aggregation unit 320 is illustrated within workstation 1002. It will be appreciated that there may be other configurations for error monitor 302.

It is noted that those skilled in the art will appreciate that various modifications of detail may be made to the embodiments described herein, which would come within the spirit and scope of the invention as defined in the following claims.

We claim:

1. A method of identifying failures in a statistics collection process in a communication network, said method comprising:
   continually collecting statistics at one or more collector stations from said communications network;
   generating a derived communications attribute from said statistics at intervals, said derived communications attribute being dependent on the performance of the statistics collection process:
   comparing the derived communications attribute for a first time interval with the derived communications attribute for a second interval to generate a comparison result; and
   generating an alarm signal when said comparison result meets a predetermined condition to indicate a statistics collection failure.

2. A method as claimed in claim 1, wherein said network has a plurality of network segments, and further comprising:
   collecting said statistics at a plurality of collector stations associated with respective said network segments;
   transferring the statistics collected from said plurality of collector stations to an aggregate collector station; and
   combining the statistics received at the aggregate station into aggregate statistics for said collector stations; and
   wherein said derived communication attribute is generated from said aggregate statistics.

3. A method, as claimed in claim 2, wherein said alarm signal is generated when the difference between said derived communication attributes for said first and second interval passes a threshold value.

4. A method, as claimed in claim 2, wherein said alarm signal is generated when the derived communication attributes for said first and second intervals exhibit at least a predetermined percentage change.

5. A method as claimed in claim 2, wherein said derived communication attribute includes the numbers of statistics collected during said respective first and second time intervals, and said alarm condition is raised when the number of statistics collected during said second time interval is less than the number of statistics collected during said first time interval.

6. A method as claimed in claim 5, wherein said derived communications attribute is generated at regular intervals.

7. A method as claimed in claim 2, wherein said derived communications attribute is generated at a workstation different from said aggregate collector station.

8. A method as claimed in claim 2, wherein each of collector stations gather statistics from a plurality of nodes in said communication network.

9. An error monitor for detecting statistics collection failures in a statistics collection process in a communication network including one or more statistics collector stations for continually collecting statistics from said communications network, said error monitor comprising:
   a generation unit generating a derived communication attributes from collected statistics from said communication network over time intervals;
   a storage device for storing said derived communication attributes dependent on the statistics collection process for a first time interval and for a second time interval;
   a comparison module comparing values for derived communication attributes for said first and second time intervals to generate a comparison result; and
   an alarm generator for raising an alarm when said comparison result meets a predetermined condition.

10. An error monitor as claimed in claim 9, wherein said predetermined condition is met when difference between the derived communication for said first and second time intervals passes a predetermined threshold.

11. An error monitor as claimed in claim 9, wherein said predetermined condition is met when said derived communication attributes for said first and second intervals exhibit at least a predetermined percentage change.

12. An error monitor as claimed in claim 9, comprising:
a plurality of said statistics collector stations; and
an aggregate statistics collector station receiving statistics from said plurality of statistics collector stations and combining the statistics received from the plurality of collector stations into aggregate statistics; and
wherein said generation unit generates said derived communication attribute from said aggregate statistics.

13. An error monitor as claimed in claim 12, wherein said error monitor is located at a workstation different from said statistics collector station.

14. An error monitor as claimed in claim 12, each of said collector stations is configured to gather statistics from a plurality of nodes in said communication network.

15. A method of detecting failures in a statistics collection process in a communication network, said method comprising:
continually collecting statistics from a plurality of statistics collector stations;
arranging for the statistics collected from said collector stations to be transmitted at time intervals to an aggregation unit to create an aggregated statistics file for each time interval;
detecting the presence of said aggregated statistics file for each said time interval; and
creating an alarm condition in response to a particular outcome of said detecting step.

16. A method as claimed in claim 15, wherein when said aggregated statistics file for said time interval does not exist, said status of said alarm condition is created.

* * * * *